(12) United States Patent
Marvaniya et al.

(10) Patent No.: US 11,645,308 B2
(45) Date of Patent: May 9, 2023

(54) CUSTOMIZING AGRICULTURAL PRACTICES TO MAXIMIZE CROP YIELD

(71) Applicant: International Business Machines Corporation, Armonk, NY (US)

(72) Inventors: Smitkumar Narotambhai Marvaniya, Bangalore (IN); Shantanu R. Godbole, Bangalore (IN); Sumanta Mukherjee, Bangalore (IN); Vikas C. Raykar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/884,776

(22) Filed: May 27, 2020

(65) Prior Publication Data
US 2021/0374161 A1    Dec. 2, 2021

(51) Int. Cl.
*G06F 16/28* (2019.01)
*G06F 16/24* (2019.01)
*G06F 16/29* (2019.01)
*A01B 79/00* (2006.01)
*G06F 16/2458* (2019.01)

(52) U.S. Cl.
CPC ......... *G06F 16/285* (2019.01); *A01B 79/005* (2013.01); *G06F 16/2458* (2019.01); *G06F 16/29* (2019.01)

(58) Field of Classification Search
USPC ........................................................ 707/737
See application file for complete search history.

(56) References Cited

U.S. PATENT DOCUMENTS 8,306,750 B2    11/2012    Griffin
9,401,030 B2 *   7/2016    Nelan ................. G06T 7/0002
(Continued)

FOREIGN PATENT DOCUMENTS

JP    2010166851    8/2010
WO   2015051339    4/2015

OTHER PUBLICATIONS

Brown M., Smart farming—automated and connected agriculture, engineering. com, Mar. 2018.
(Continued)

*Primary Examiner* — Ashish Thomas
*Assistant Examiner* — Raheem Hoffler
(74) *Attorney, Agent, or Firm* — Ryan, Mason & Lewis, LLP

(57) ABSTRACT

Methods, systems, and computer program products for customizing agricultural practices to maximize crop yield are provided herein. A computer-implemented method includes obtaining data pertaining to (i) a geographical area comprising a plurality of regions and (ii) one or more agricultural practices applied to the geographical area; assigning each of the plurality of regions to a respective cluster of a set clusters, based at least in part on comparing features identified in the data, wherein similar ones of said regions are assigned to the same cluster; generating instructions that are specific to a given cluster in the set, wherein the instructions relate to agricultural tasks to be performed on the regions assigned to the given cluster; and triggering, based on said instructions, one or more automated farming processing devices, thereby carrying out at least a portion of said agricultural tasks.

20 Claims, 10 Drawing Sheets

(56) References Cited

U.S. PATENT DOCUMENTS

| | | | | |
|---|---|---|---|---|
| 9,652,840 | B1* | 5/2017 | Shriver | G06T 7/0004 |
| 9,934,538 | B2* | 4/2018 | Hunt | H04L 67/12 |
| 10,425,832 | B1* | 9/2019 | Zawadzki | H04L 41/12 |
| 11,153,503 | B1* | 10/2021 | Ebrahimi Afrouzi | H04N 7/18 |
| 2013/0142438 | A1* | 6/2013 | Schloegel | G06T 17/005 |
| | | | | 382/199 |
| 2015/0100358 | A1 | 4/2015 | Klavins | |
| 2016/0003790 | A1 | 1/2016 | Osborne et al. | |
| 2016/0078375 | A1 | 3/2016 | Ethington et al. | |
| 2016/0223506 | A1* | 8/2016 | Shriver | G06K 9/00657 |
| 2016/0292248 | A1* | 10/2016 | Garcia | G06F 16/26 |
| 2017/0098384 | A1 | 4/2017 | Hara | |
| 2017/0164556 | A1 | 6/2017 | Aharoni et al. | |
| 2017/0311559 | A1* | 11/2017 | Ebert | A01G 17/02 |
| 2018/0211156 | A1* | 7/2018 | Guan | G06Q 10/04 |
| 2019/0050948 | A1* | 2/2019 | Perry | A01B 79/005 |
| 2019/0147094 | A1* | 5/2019 | Zhan | G06F 16/2474 |
| | | | | 707/718 |
| 2019/0347745 | A1* | 11/2019 | Bones | G06F 16/29 |
| 2019/0384283 | A1* | 12/2019 | Chowdhary | G06F 16/29 |
| 2020/0029490 | A1* | 1/2020 | Bertucci | G06F 16/29 |
| 2020/0134420 | A1* | 4/2020 | Spooner | G06F 16/29 |
| 2020/0134484 | A1* | 4/2020 | Hazard | G06N 5/025 |
| 2020/0134485 | A1* | 4/2020 | Sood | A01B 79/005 |
| 2020/0327603 | A1* | 10/2020 | Jiang | G06F 16/2462 |
| 2020/0364843 | A1* | 11/2020 | Stueve | G06K 9/00657 |
| 2021/0035034 | A1* | 2/2021 | Enoki | A01B 79/005 |
| 2021/0105931 | A1* | 4/2021 | Anderson, Jr. | G06F 16/25 |
| 2021/0142161 | A1* | 5/2021 | Huang | G06F 16/2465 |
| 2021/0158041 | A1* | 5/2021 | Chowdhary | G06N 20/10 |

OTHER PUBLICATIONS

Sylvester, Gerard, ed. E-agriculture in action: Drones for agriculture. Food and Agriculture Organization ofn the United Nations and International Telecommunication Union, 2018.

Ayaz, M., Ammad-Uddin, M., Sharif, Z., Mansour, A., & Aggoune, E. H. M., Internet-of-Things (IoT)-Based Smart Agriculture: Toward Making the Fields Talk. IEEE Access, 7, 129551-129583, Aug. 2019.

Trafton, Anne, The future of agriculture is computerized, MIT News Office, available at http://news.mit.edu/2019/algorithm-growing-agriculture-0403, Apr. 3, 2019.

Harriet Brewis, Tree-planting drones could help restore the world's forests, The Evening Standard, https://www.standard.co.uk/news/world/treeplanting-drones-could-help-restore-world-s-forests-a4116376.html; Apr. 12, 2019.

Dr. Sangeeta Soi, Drone That Can Plant 10,000 Trees a Day. https://krishijagran.com/farm-mechanization/drone-that-can-plant-10-000-trees-a-day/, Krishi Jagran Media Group, May 2, 2019.

Adele Peters, These tree-planting drones are firing seed missiles to restore the world's forests, Fast Company, https://www.fastcompany.com/90329982/these-tree-planting-drones-are-firing-seed-missiles-to-restore-the-worlds-forests, Apr. 10, 2019.

* cited by examiner

CUSTOMIZING AGRICULTURAL PRACTICES TO MAXIMIZE CROP YIELD

FIELD

The present application generally relates to information technology and, more particularly, to artificial intelligence techniques for maximizing crop yield.

BACKGROUND

Generally, crop yield refers to a measurement of the amount of crop grown per unit area of land. A number of factors can affect crop yield such as, for example, soil fertility, availability of water, climate, diseases, and pests. Although some innovations have helped improve crop yields (such as, for example, fertilizer, improved tools, and new farming techniques), further improvements are still needed.

SUMMARY

In one embodiment of the present invention, techniques for customizing agricultural practices to maximize crop yield are provided. An exemplary computer-implemented method includes the steps of obtaining data pertaining to (i) a geographical area comprising a plurality of regions and (ii) one or more agricultural practices applied to the geographical area; assigning each of the plurality of regions to a respective cluster of a set clusters, based at least in part on comparing features identified in the data, wherein similar ones of said regions are assigned to the same cluster; generating instructions that are specific to a given cluster in the set, wherein the instructions relate to agricultural tasks to be performed on the regions assigned to the given cluster; and triggering, based on said instructions, one or more automated farming processing devices, thereby carrying out at least a portion of said agricultural tasks.

Another example of an embodiment includes a method comprising obtaining data for a set of farms, wherein the data comprise one or more of: (i) location data for at least a portion of the farms in the set, (ii) historical crop yield data for at least a portion of the farms in the set, (iii) historical farming practices data climate data for at least a portion of the farms in the set, (iv) climate data for at least a portion of the farms in the set, and (v) sensor data from one or more sensors of at least a portion of the farms in the set; assigning each farm within the set of farms to one of a plurality of clusters using a clustering technique, wherein similar farms within said set of farms are assigned to the same cluster, based on a comparison of features identified in the data; generating, for a given one of the clusters, instructions for performing one or more agricultural tasks on the farms in the given cluster, wherein said instructions are generated to increase at least one of (i) crop yield and (ii) profits; and triggering, based on said instructions, one or more automated farming processing devices to carry out at least a portion of said agricultural tasks.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Exemplary embodiments described herein provide techniques for customizing agricultural practices to improve crop yield. Additionally, one or more exemplary embodiments enable counterfactual queries and interventions on cohorts (or clusters) of farms, and improved tools for subject matter experts to provide feedback for customizing agricultural practices.

Existing techniques related to one or more of the illustrative embodiments herein include: providing recommendations for agricultural activities along with a recommendation score based on analysis of, for example, field data, field condition, and weather data; generating a list of optimal farming activities including different phases of farming; and predicting crop yield by analyzing remote sense data. However, each of these techniques suffers from one or more of the following disadvantages: failure to provide customized farming practices based on specific cohorts of farms along with domain knowledge and/or constraints; and lack of ability to intelligently trigger automated farming processing devices to enable such customized farming practices for autonomous farming.

The term "automated farming processing device" is used herein to broadly refer to aerial and/or terrestrial devices that automate one or more farming practices (e.g., applying fertilizer, planting seeds, watering, etc.)

As described herein, an embodiment of the present invention includes providing customized farming practices to improve crop yield. Furthermore, at least some example embodiments allow subject matter experts (SMEs) to provide input for customizing the farming practices through, for example, counterfactual queries and interventions on cohorts of farms. The farming practices can be determined by analyzing, for example, farm metadata and/or data from remote sensors in such a way to improve (e.g., maximize) crop yield. Additionally, these and other embodiments may include determining a sequence of tasks to be performed, and triggering automated farming processing devices to perform at least a portion of these tasks, thereby enabling autonomous farming techniques. Further, such automated farming processing devices may provide feedback which can then be used to dynamically fine-tune the customized farming practices.

Figure 1:
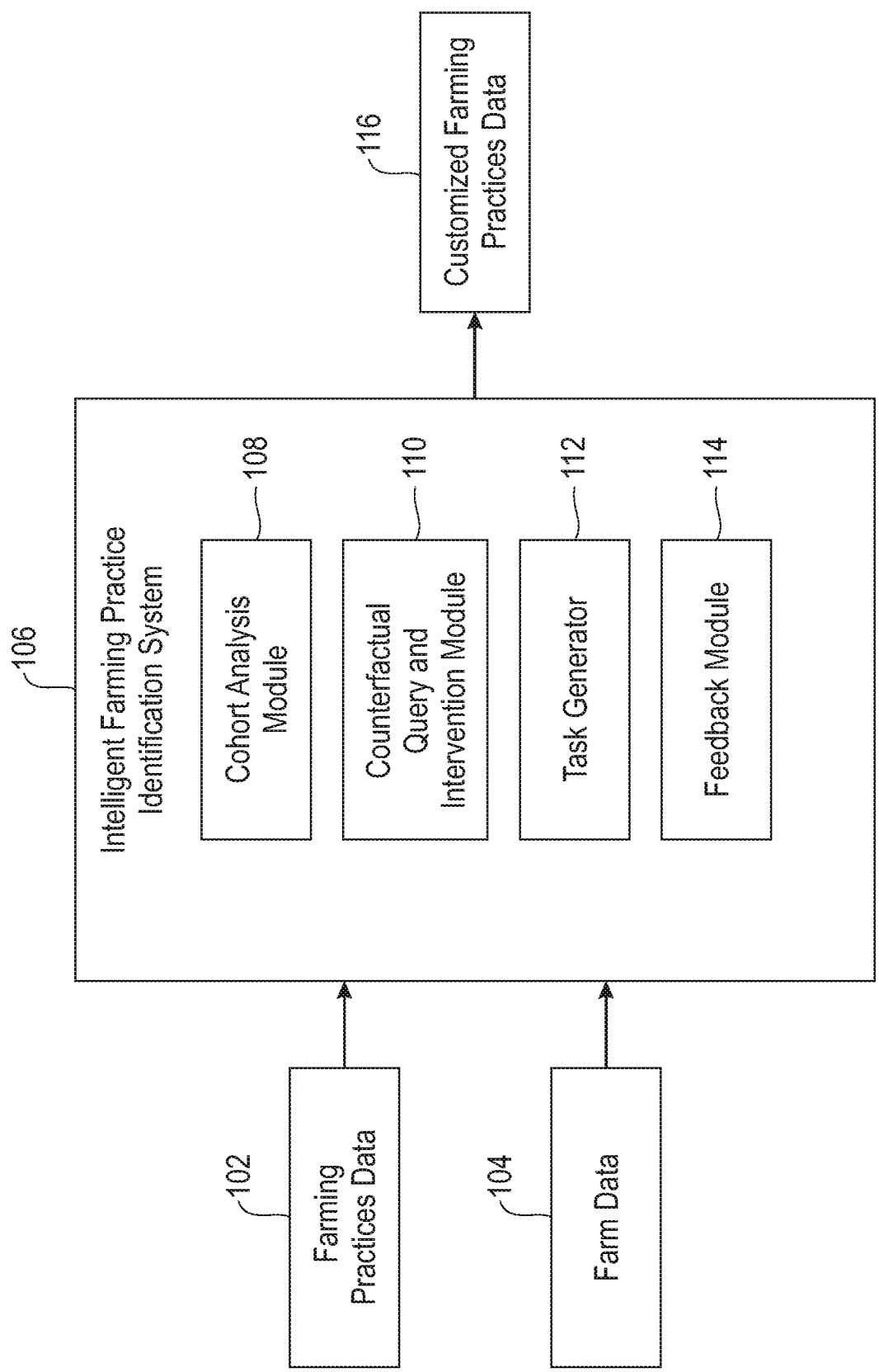
FIG. 1 is a diagram illustrating a system architecture in accordance with exemplary embodiments.

FIG. 1 is a diagram illustrating a system architecture according to an illustrative embodiment. By way of illustration, the FIG. 1 embodiment includes an intelligence farming practice identification system 106. Also shown in FIG. 1 are farming practices data 102 and farm data 104 which are provided as input to the system 106, and customized farming practices data 106 which are output by system 106.

In the FIG. 1 embodiment, the intelligence farming practice identification system 106 includes a cohort analysis module 108, a counterfactual query and intervention module 110, a task generator 112, and a feedback module 114. The cohort analysis module 108 analyzes the inputs 102, 104 to determine a set of cohorts (or clusters) of farms. The counterfactual query and intervention module 110 enable information from SMEs to be considered when determining customized farming practices for one or more of the clusters. The task generator 112 determines customized farming practices for different cohorts and generates tasks for carrying out these farming practices. The task generator 112 may, for example, generate instructions (e.g., in the form of computer code) to be transmitted to a set of automated farming processing devices (not shown in FIG. 1) to carry out at least a portion of the tasks. The feedback module 114 obtains feedback following the performance of the tasks (such as, for example, from the automated farming processing devices and/or from subject matter experts). For example, feedback from an automated farming processing device may be collected and analyzed to help avoid pest attacks (e.g., via application of chemicals), identify situations such as whether irrigation is required at a specific point, enable re-sowing activities, etc. Such information can then be used to further refine the customized farming practices. In one or more example embodiments, the task generator 112 may strike a balance between maximizing profits for a particular farm and maximizing the overall crop yield.

Figure 2:
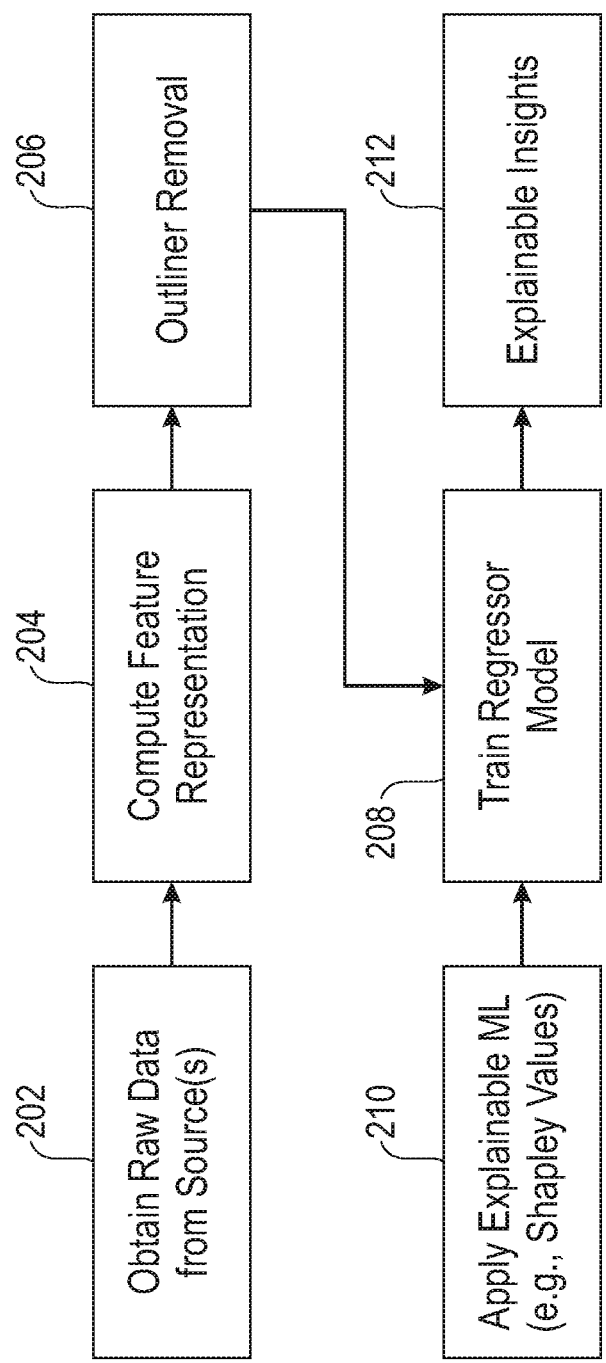
FIG. 2 is a flow diagram of a cohort analysis process in accordance with exemplary embodiments.

FIG. 2 shows a flow diagram of a cohort analysis process in accordance with exemplary embodiments. For example, the flow diagrams in FIG. 2 may be performed at least in part by the cohort analysis module 108 of the intelligence farming practice identification system 106.

Step 202 includes obtaining raw data from one or more data sources. For example, the raw data may be related to one or more of: farming practices (e.g., types and/or amounts of fertilizer), farm metadata (e.g., historical farm data such as historical crop yields), weather conditions, remote sensed data, and domain constraints, for example. More generally, the data may correspond to geographical areas and/or one or more portions thereof. For example, such data may correspond to a single farm, multiple farms, individual field within such farms, and/or groups of fields within such farms as is to be appreciated by those skilled in the art.

For the purposes of this disclosure, the terms "farm" and "field" are intended to be broadly construed and generally refer to a geographical area of land that is used and/or is suitable for farming. Also, these terms are used interchangeably herein, unless the context indicates otherwise. For the purposes of this disclosure, it is also assumed that a given farm or field is associated with a single crop; however, this is not intended to be limiting and embodiments described herein may also be applicable to fields and/or farms having a plurality of crops.

Step 204 includes combining the raw data to compute feature representations (e.g., mathematical representations such as vector representations, for example) for specific fields. For example, step 204 may include combining the raw data to compute weather data (e.g., at a field, town, or county level), a normalized difference vegetation index (NDVI) (e.g., at a farm level), soil moisture data (e.g., at a field level), derived features (e.g., farming practices). Also, step 204 may include performing a feature normalization process. For example, assume the raw data include data corresponding to amounts of fertilizer applied to a first field and a second field. Step 204 can normalize these amounts based on the relative sizes of the first and second fields.

Step 206 includes performing an outlier removal process to remove potential outliers from the feature representations.

Step 208 includes using the feature representations generated by step 204 to train a machine learning regressor model. This regressor model is trained to predict crop yields based on the feature representations for specific farms (i.e., at the farm level).

Additionally, step 210 includes applying an explainable machine learning model to the trained regressor model. This allows, for example, the trained regressor model to output explainable insights 212 along with each prediction. In at least one example embodiment, the output of the explainable machine learning model may be in the form of Shapley values for a given estimated crop yield that is the output of the regressor model. By way of example, the explainable insights 212 may include a list of features that are ranked based on their relative importance for maximizing crop yield. Such features may include, for example, normalized difference vegetation index, row-to-row spacing, electrical conductivity (EC) in the soil, amount of nitrogen fertilizer applied, amount of phosphorous fertilizer applied, pH levels, water source, etc. Optionally, one or more example embodiments may include obtaining data (e.g., via a graphical user interface) from an SME to help determine the importance of various features on the impact of crop yield.

For example, the Shapley values may include positive Shapley values (i.e., indicating the number of datapoints per feature type having a positive effect on crop yield) and negative Shapley values (i.e., indicating the number of datapoints per feature type having a negative effect on crop yield). As such, an explainable model may be built based on the Shapley values to analyze the positive and negative impact of the crop yield. As such, one or more example embodiments may then identify a set of cohorts by clustering on the set of important explainable feature space (e.g., the Shapley value space).

Figure 3:
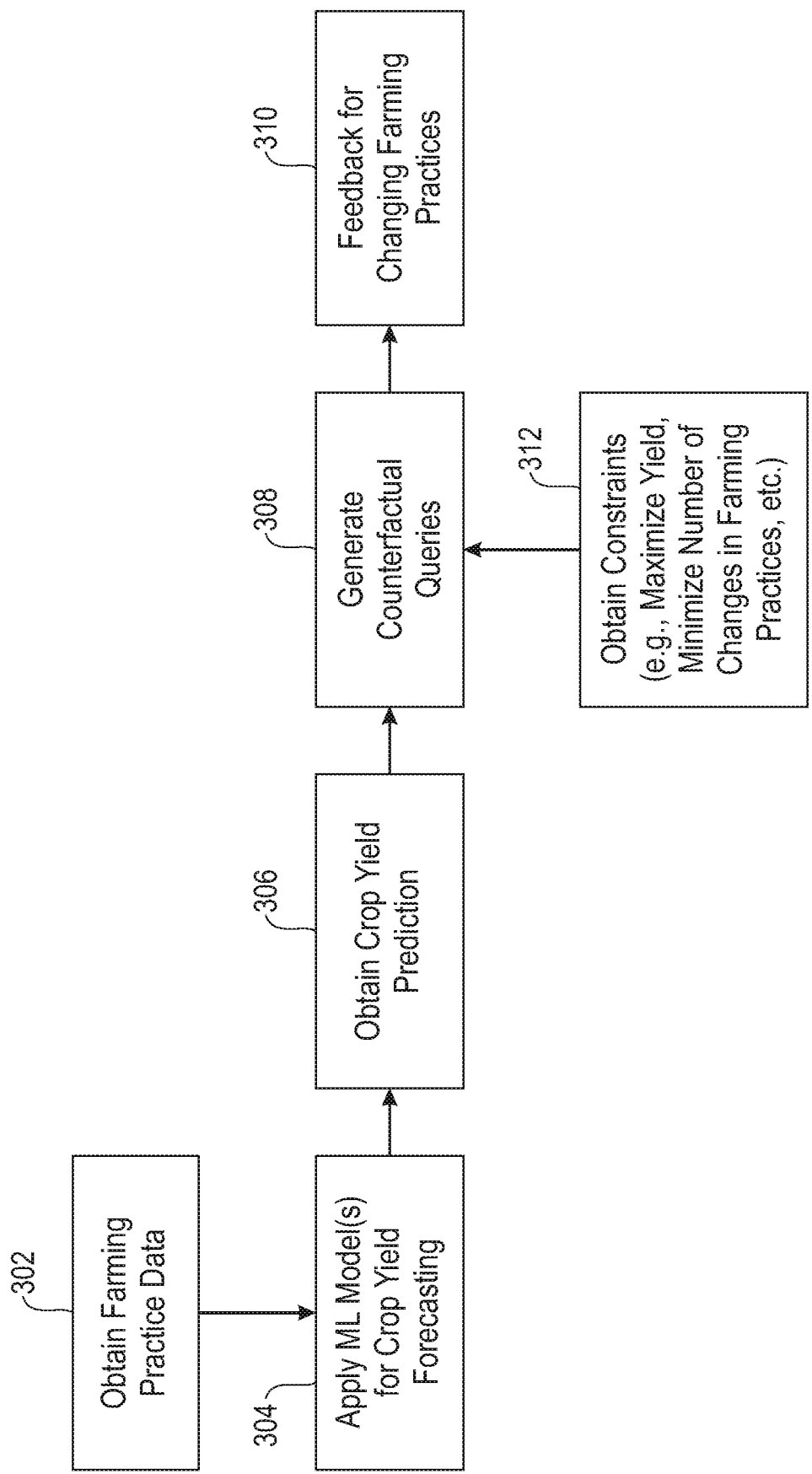
FIG. 3 is a flow diagram of a counterfactual query generation process in accordance with exemplary embodiments.

FIG. 3 is a flow diagram of a counterfactual query generation process in accordance with exemplary embodiments. Step 302 includes obtaining one or more sets of historical farming practices data, and step 304 includes applying one or more machine learning models (such as one generated in accordance with FIG. 2, for example) to the one or more sets of data). Step 306 includes obtaining a crop yield prediction as output. Step 308 includes generating counterfactual queries. Step 310 includes obtaining feedback in response to the counterfactual queries which may be used for changing the farming practices of specific farms. Optionally, step 312 includes obtaining one or more constraints that may be considered at step 308.

By way of example, the farming practices may include parameters such as, for example, an amount of nitrogen fertilizer applied, an amount of phosphorous fertilizer applied, spacing between plants, spacing between rows, and a yield quantity in kilograms. As such, non-limiting examples of counterfactual queries may include one or more of the following: (1) "What would be the impact on yield if farmer X applied normalized N 60 kg per acre?" (2) "What would be the impact on yield if farmer X could change row to row spacing to 50 inches instead of 100 inches?"; and (3) "What could be the impact on yield if farmer X could have performed the gap-filling activity within 10 days from transplantation?" The feedback at step 310 may include changes to the farming practices based on the responses to the queries.

In one or more example embodiments, such counterfactual queries may consider the uncertainty associated with one or more features, thereby making the system more robust. By way of example, there can be uncertainties associated with one or more environmental factors (e.g., a rainfall prediction). A counterfactual explanation can provide input that is indicative of controllable parameters (e.g., an amount of fertilizer to apply) to account for such uncertainties.

Figure 4:
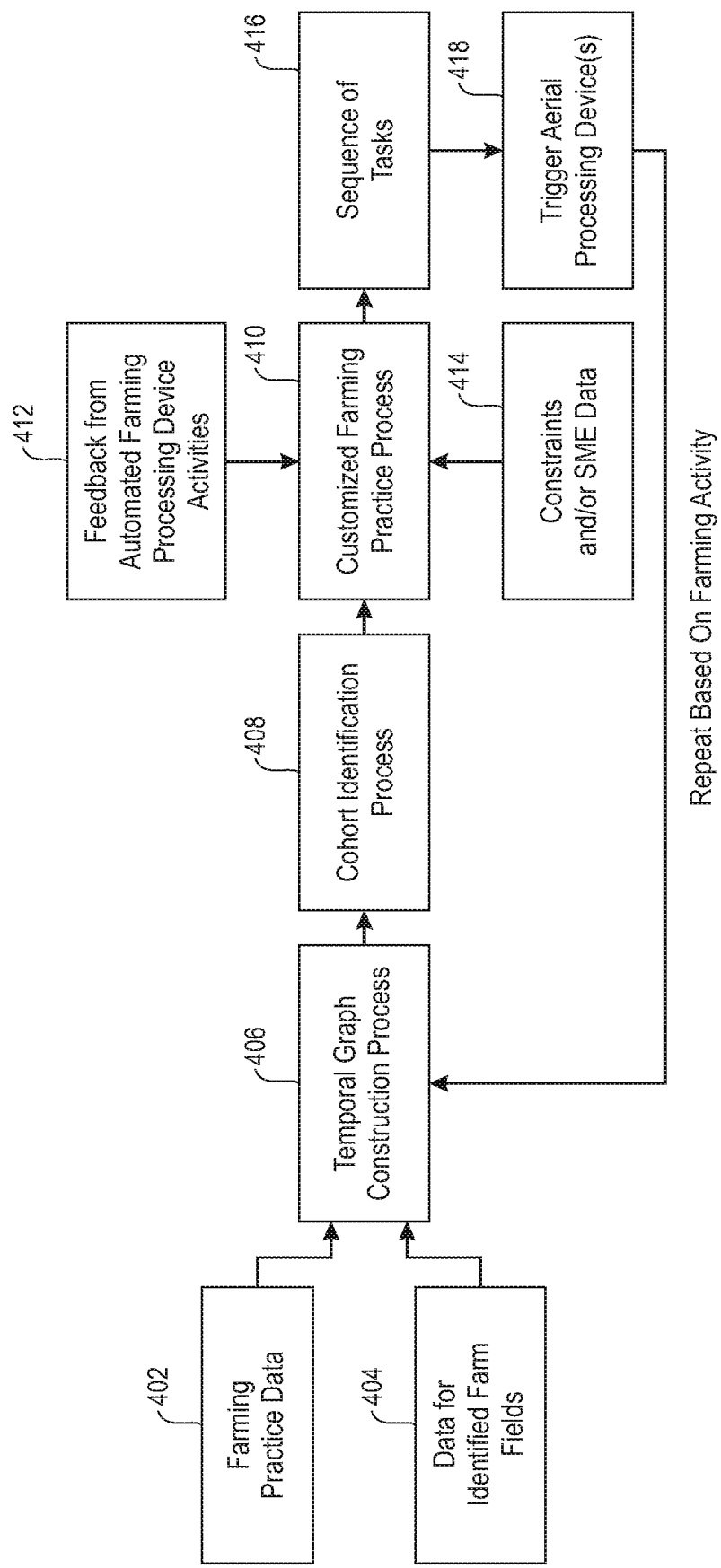
FIG. 4 is a flow diagram of an autonomous farming process in accordance with an exemplary embodiments.

FIG. 4 is a flow diagram of an autonomous farming process in accordance with an exemplary embodiment. In the FIG. 4 embodiment, farming practice data 402 and data for one or more identified field 404 are provided as input to a temporal graph construction process 406 (as discussed in more detail below in conjunction with FIG. 5). Next, a cohort identification process 408 is performed (e.g., as described elsewhere herein), which assigns the fields to respective cohorts, and a customized farming practice process 410 is performed to determine customized farming practices for each of the cohorts. The process 410 may optionally consider constraints and/or feedback from SME. A sequence of tasks 416 is then output in accordance with the customized farming practices. In the FIG. 4 embodiment, the sequence of tasks 416 may trigger one or more automated farming processing devices to carry out at least a portion of the tasks. Processes 406, 408, and 410 may then be updated/repeated based on the performed farming activities, including feedback from the automated farming processing device activities 412.

Additionally, in one or more embodiments the sequence of tasks may be determined in such a way that minimizes cost associated with the automated farming processing devices.

Figure 5:
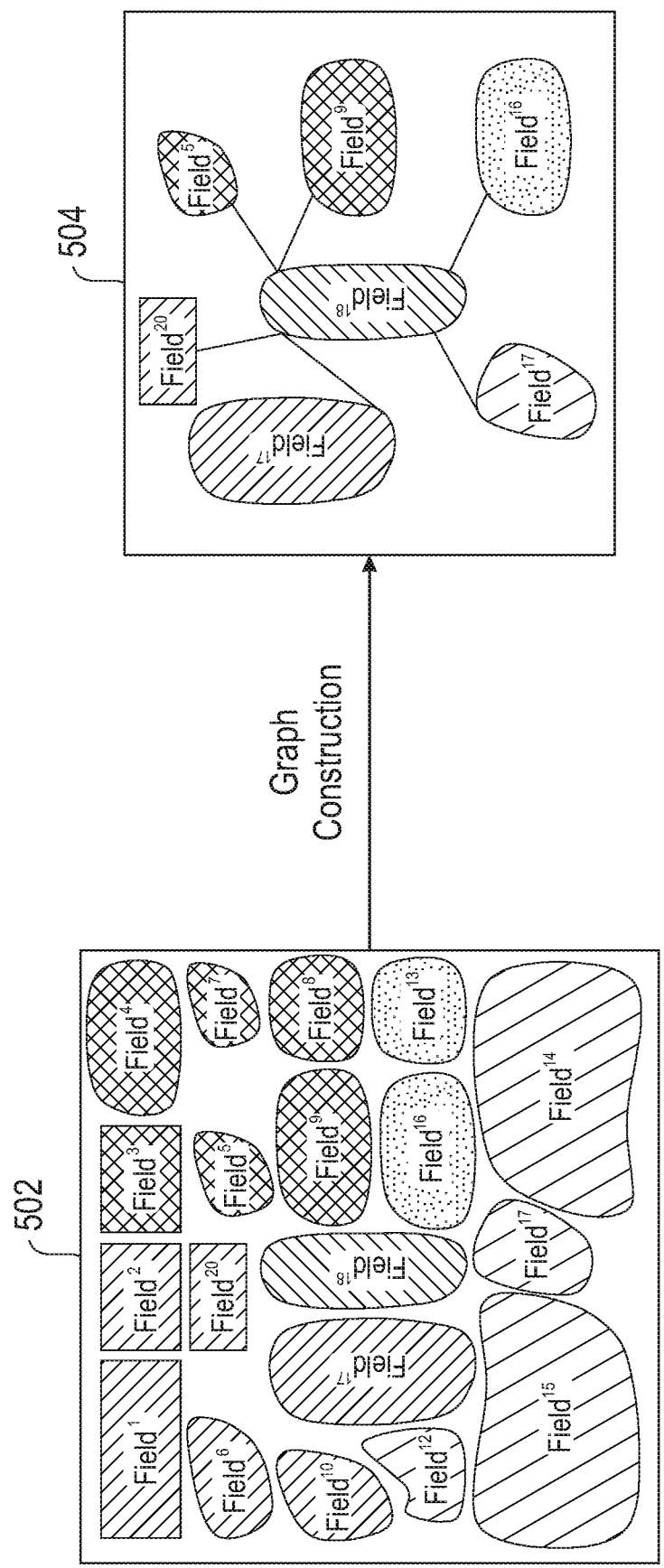
FIG. 5 shows an example of a graph construction process in accordance with an exemplary embodiments.

FIG. 5 shows an example of a graph construction process in accordance with exemplary embodiments. In this example, the graph construction process is applied to a number of identified fields 502 and results in a causal graph 504. By way of example, the graph construction process may include identifying field boundaries of the fields 502 based on field coordinates (e.g., global positioning system coordinates). Each field is considered as a node in the graph, and each node in the graph is associated with a set of attributes that captures, for example, weather data, soil moisture, farming practice details, etc. Edges between nodes in the graph capture information about (i) distance between the farms and (ii) transportation conditions between the farms, to plan the instructions for the automated farming processing devices. For example, if there is a forest and/or mountain between neighboring fields, then this can be captured as a part of edge attributes within the graph. Based on the farming activities over the time, the graph is updated. In such an example, the cohort identification may be performed based on, for example, the plantation category, farming practices, weather parameters, SMEs inputs along with analyzing farm fields metadata to determine a set of cohort insights. The cohort insights can be applied on a set of fields which are managed by autonomous farming by triggering automated farming processing devices. In the example shown in FIG. 5, the different cohorts are represented by different types of shading.

In this manner, the temporal graph may be used to help generate counterfactual queries to understand the explainable insights on the farming practices. Additionally, causal intervention queries may be generated with the help of subject matter experts to customize the farming practices.

Figure 6:
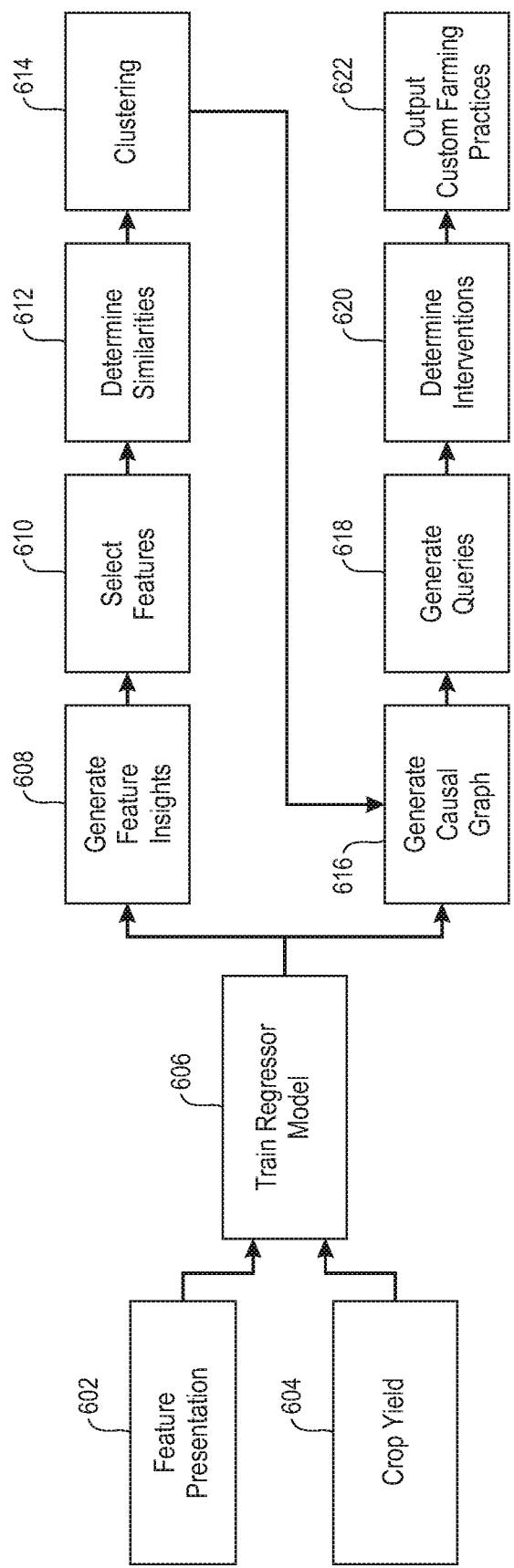
FIG. 6 shows an example flow chart in accordance with an exemplary embodiment.

FIG. 6 shows an example flow chart for techniques for customizing farming practices in accordance with an exemplary embodiment. In the FIG. 6 embodiment, feature representations 602 (e.g., corresponding to farming practices) and crop yields 604 (e.g., historical crop yields) are obtained and used as training data. Step 606 includes training a regressor model 606 based on the obtained training data. For example, the regressor model may be trained to predict crop yields given a set of farming practices in a manner similar to those described elsewhere herein. In at least one example embodiment, the regressor model is trained using a XGBoost algorithm.

Step 608 includes generating feature insights 608 using a machine learning model. The feature insights explain the output of the regressor model. For example, the feature insights may correspond to Shapley values, wherein the Shapley values quantify the positive and negative impacts for different values of each of the plurality of features considered by the regressor model. Step 610 includes selecting features based on the relative importance of all the features that are considered by the regressor model. In at least one example, the selected features 610 are determined using feedback from one or more subject matter experts. Step 612 includes determining similarities 612 between a plurality of farms based on the selected features. Such similarities may be determined using a similarity matrix, for example.

For example, similarity matrix may be computed by estimating the similarity between the feature representation of the selected feature for every pair of farms. The similarity value may be estimated using various different techniques including, for example, Cosine distance, Euclidean distance, and 12 distance between d dimensional vectors. The feature representation for each farm may represent the impact on yield associated with each of the selected features. Impact information may be derived using explainable model Shapley values, which estimate the positive and negative impacts for each of the selected features.

Step 614 includes clustering the plurality of farms based on the determined similarities, such as by applying an unsupervised clustering technique, for example. By way of example, a first cluster of farms may be identified based on whether the farms have sufficient amounts of water, whether sufficient nutrients are being applied, or based on gap filling activity, for example.

Step 616 includes generating a causal graph for each of the resulting clusters of the farms such as, for example, by applying a Chow-Liu Causal Graph (tree) or a PC Algorithm. The causal graph indicates identifies the chain of correlation across the features for a given cluster.

Step 618 includes using the causal graph to generate counterfactual queries to understand the explainable insights on the farming practices.

Step 620 includes determining causal interventions based on input (e.g., from a subject matter expert) received in response to the counterfactual queries. Step 622 includes outputting customized farming practices for each cluster based on the determined interventions.

Figure 7:
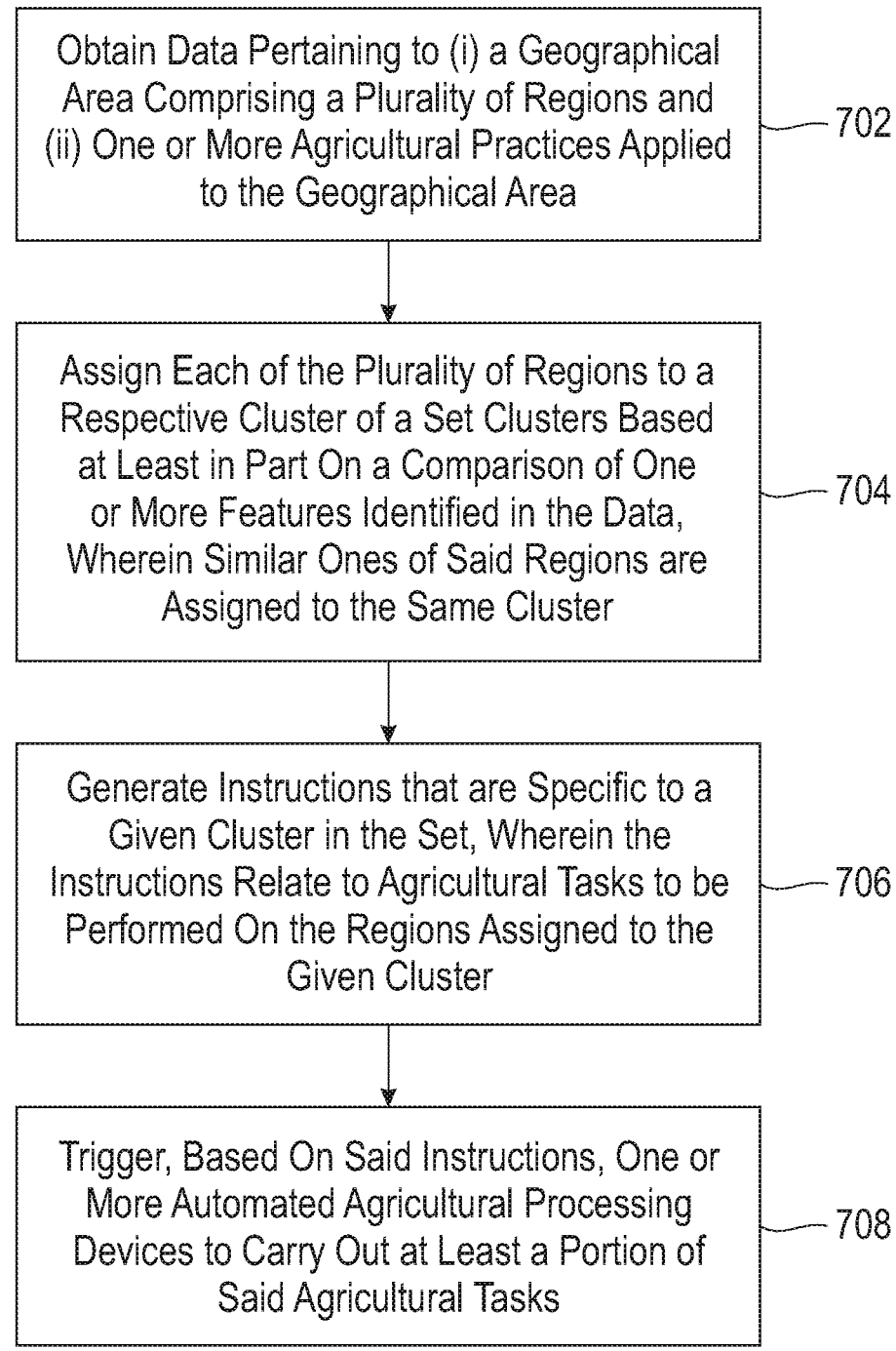
FIG. 7 is a flow diagram illustrating techniques according to an embodiment of the invention.

FIG. 7 is a flow diagram of a process in accordance with an embodiment of the present invention. Step 702 includes obtaining data pertaining to (i) a geographical area comprising a plurality of regions and (ii) one or more agricultural practices applied to the geographical area. Step 704 includes assigning each of the plurality of regions to a respective cluster of a set clusters, based at least in part on comparing features identified in the data, wherein similar ones of said regions are assigned to the same cluster. Step 706 includes generating instructions that are specific to a given cluster in the set, wherein the instructions relate to agricultural tasks to be performed on the regions assigned to the given cluster. Step 708 includes triggering, based on said instructions, one or more automated farming processing devices, thereby carrying out at least a portion of said agricultural tasks.

The generating at step 706 may include generating the set instructions, which then increase a crop yield for regions assigned to said given cluster. The process may include obtaining additional data from sensors of said one or more automated farming processing devices; and adjusting said instructions based at least in part on said further data. The process may include in response to said triggering, obtaining further data from one or more sensors of said one or more automated farming processing devices; and adjusting said instructions based at least in part on said further data. The process may include obtaining information from one or more subject matter experts pertaining to one or more of the plurality of regions, in response to one or more counterfactual queries for the given cluster. The process may include training a machine learning model to predict a crop yield based at least on (i) historical crop yields for said geographical area and (ii) historical agricultural practices for said geographical area; and generating said counterfactual queries using the trained machine learning model. The process may include obtaining one or more constraints for generating said instructions, the one or more constraints comprising one or more of: (i) maximizing an overall crop yield for the given cluster; (ii) minimizing changes to existing agricultural practices; and (iii) decreasing the number of clusters. The generating at step 706 may include constructing a temporal graph comprising a plurality of nodes and a plurality of edges, wherein (i) each node represents one of the plurality of regions and its corresponding data, and (ii) each edge represents distance between the regions of the nodes corresponding to the edge and the travel conditions between the regions of the nodes corresponding to the edge. Generating said instructions may include updating said temporal graph over time based on performance of said agricultural tasks. The data may include one or more of: global positioning data; weather data; data indicative of one or more characteristics for one or more crops; data indicative of soil moisture; data from one or more remote sensors associated with said geographical area; and data indicative of soil moisture levels.

Another example of an embodiment includes a process comprising obtaining data for a set of farms, wherein the data comprise one or more of: (i) location data for at least a portion of the farms in the set, (ii) historical crop yield data for at least a portion of the farms in the set, (iii) historical farming practices data climate data for at least a portion of the farms in the set, (iv) climate data for at least a portion of the farms in the set, and (v) sensor data from one or more sensors of at least a portion of the farms in the set; assigning each farm within the set of farms to one of a plurality of clusters using a clustering technique, wherein similar farms within said set of farms are assigned to the same cluster, based on a comparison of features identified in the data; generating, for a given one of the clusters, instructions for performing one or more agricultural tasks on the farms in the given cluster, wherein said instructions are generated to increase at least one of (i) crop yield and (ii) profits; and triggering, based on said instructions, one or more automated farming processing devices to carry out at least a portion of said agricultural tasks.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
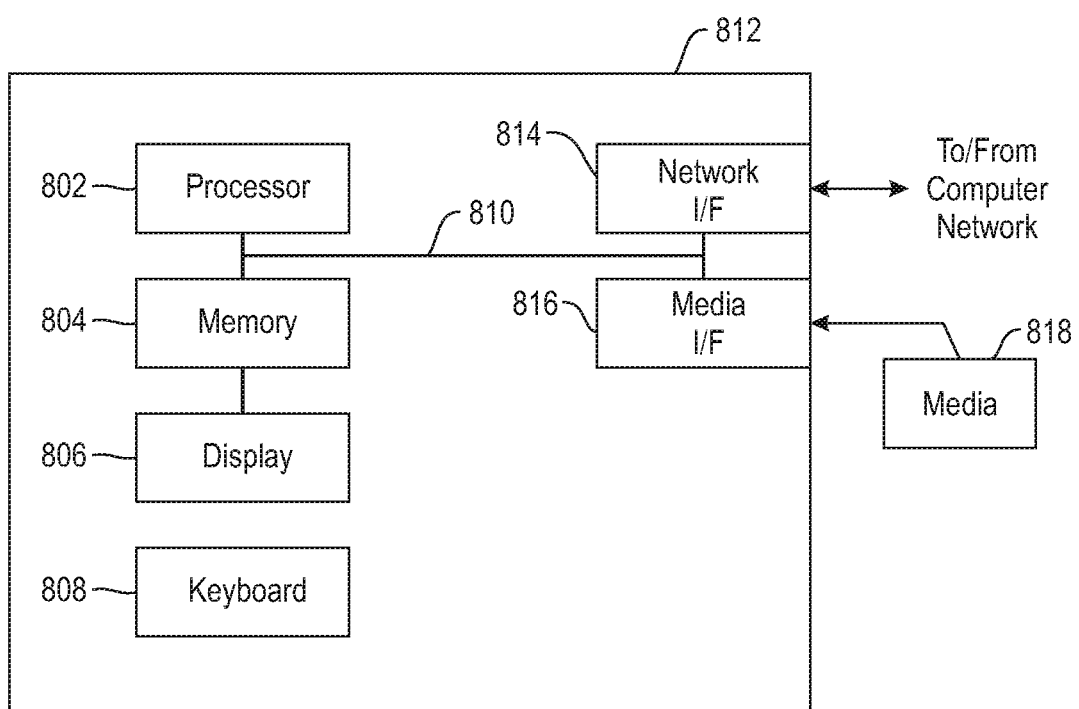
FIG. 8 is a system diagram of an exemplary computer system on which at least one embodiment of the invention can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
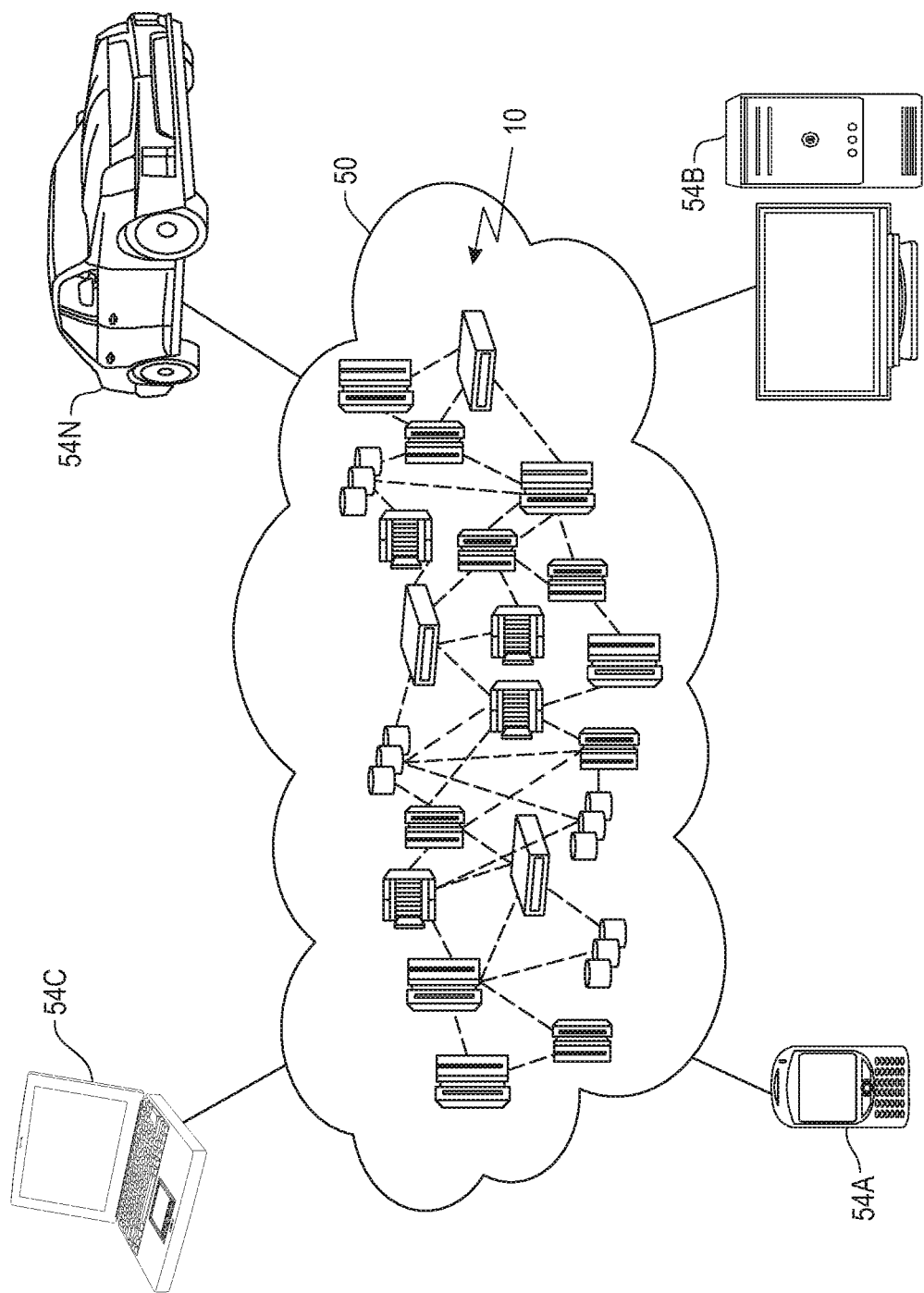
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
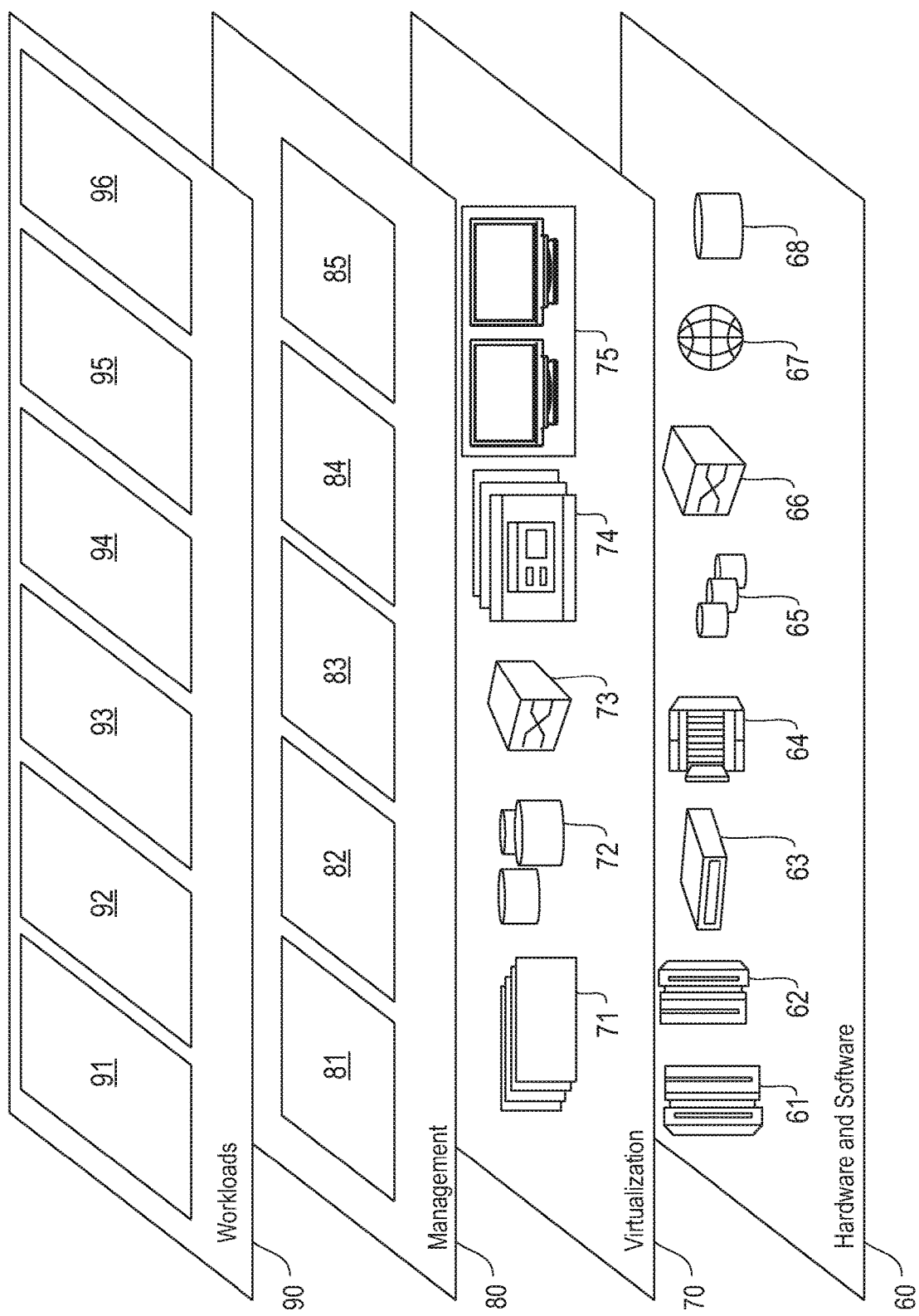
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and customized agricultural practices 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Without in any way limiting the scope, interpretation, or application of the claims appearing below, a technical effect of one or more of the example embodiments disclosed herein is customizing farming practices to improve crop yield. Another technical effect of one or more of the example embodiments disclosed herein providing customized farming practices based on identified cohorts of farms along with domain knowledge and/or constraints. Yet another technical effect of the example embodiments disclosed herein is triggering automated farming processing devices for enabling customized farming practices in autonomous farming.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining data pertaining to a geographical area comprising a plurality of regions and one or more agricultural practices applied to the geographical area;
    providing the obtained data to a machine learning regressor model, wherein the machine learning regressor model is trained to predict a crop yield for each of the plurality of regions based on a plurality of features identified in the data;
    applying a machine learning model to determine a relative impact of each of the plurality of features on the crop yield predicted by the machine learning regressor model for each of the plurality of regions, wherein the relative impact of each of the features corresponds to one of: a negative impact value and a positive impact value;
    identifying a subset of the plurality of features having the greatest impact on the predicted crop yield;
    applying an unsupervised clustering process to assign each of the plurality of regions to a respective cluster of a set clusters, wherein the unsupervised clustering process assigns similar ones of said regions to the same cluster based at least on the subset of the plurality of features;
    generating instructions that are specific to a given cluster in the set, wherein the instructions relate to agricultural tasks to be performed on the regions assigned to the given cluster, wherein said generating comprises: constructing a causal graph for the given cluster comprising a plurality of nodes and a plurality of edges, wherein each node represents one of the plurality of regions and its corresponding data, and each edge represents distance between the regions of the nodes corresponding to the edge and one or more transportation conditions between the regions of the nodes corresponding to the edge, wherein the one or more transportation conditions correspond to one or more geographical features between the regions;
    transmitting said instructions to one or more automated farming processing devices in the form of computer code, thereby triggering the one or more automated farming devices to perform at least a portion of said agricultural tasks; and
    updating over time at least one of: the set of clusters and the causal graph based on performance of said agricultural tasks;
    wherein the method is carried out by at least one computing device.

2. The computer-implemented method of claim 1, wherein said generating comprises:
    generating the instructions to increase the crop yield for regions assigned to said given cluster.

3. The computer-implemented method of claim 1, comprising:
    in response to said transmitting, obtaining further data from one or more sensors of said one or more automated farming processing devices; and
    adjusting said instructions based at least in part on said further data.

4. The computer-implemented method of claim 1, comprising:
    obtaining information from one or more subject matter experts pertaining to one or more of the plurality of regions, in response to one or more counterfactual queries for the given cluster.

5. The computer-implemented method of claim 4, comprising:
    training the machine learning regressor model based at least on (i) historical crop yields for said geographical area and historical agricultural practices for said geographical area; and
    generating said counterfactual queries using the trained machine learning regressor model.

6. The computer-implemented method of claim 1, comprising:
    obtaining one or more constraints for generating said instructions, the one or more constraints comprising one or more of: (i) maximizing an overall crop yield for the given cluster; minimizing changes to existing agricultural practices; and decreasing the number of clusters.

7. The computer-implemented method of claim 1, wherein said generating said instructions comprises updating said causal graph over time based on performance of said agricultural tasks.

8. The computer-implemented method of claim 1, wherein the data comprise one or more of:
    global positioning data;
    weather data;
    data indicative of one or more characteristics for one or more crops;
    data indicative of soil moisture;
    data from one or more remote sensors associated with said geographical area; and
    data indicative of soil moisture levels.

9. The computer-implemented method of claim 1, wherein:
    for each respective one of the features, the corresponding impact value is output by the machine learning model to form an impact value space; and
    the unsupervised clustering process is applied on at least a portion of the impact value space to assign each of the plurality of regions.

10. A computer program product comprising a computer readable storage medium having program instructions embodied therewith, the program instructions executable by a computing device to cause the computing device to:
    obtain data pertaining to (i) a geographical area comprising a plurality of regions and one or more agricultural practices applied to the geographical area;
    provide the obtained data to a machine learning regressor model, wherein the machine learning regressor model is trained to predict a crop yield for each of the plurality of regions based on a plurality of features identified in the data;
    apply a machine learning model to determine a relative impact of each of the plurality of features on the crop yield predicted by the machine learning regressor model for each of the plurality of regions, wherein the relative impact of each of the features corresponds to one of: a negative impact value and a positive impact value;
    identify a subset of the plurality of features having the greatest impact on the predicted crop yield;

apply an unsupervised clustering process to assign each of the plurality of regions to a respective cluster of a set clusters, wherein the unsupervised clustering process assigns similar ones of said regions to the same cluster based at least on the subset of the plurality of features;

generate instructions that are specific to a given cluster in the set, wherein the instructions relate to agricultural tasks to be performed on the regions assigned to the given cluster, wherein said generating comprises: constructing a causal graph for the given cluster comprising a plurality of nodes and a plurality of edges, wherein each node represents one of the plurality of regions and its corresponding data, and each edge represents distance between the regions of the nodes corresponding to the edge and one or more transportation conditions between the regions of the nodes corresponding to the edge, wherein the one or more transportation conditions correspond to one or more geographical features between the regions;

transmit said instructions to one or more automated farming processing devices in the form of computer code, thereby triggering the one or more automated farming devices to perform at least a portion of said agricultural tasks; and update over time at least one of: the set of clusters and the causal graph based on performance of said agricultural tasks.

11. The computer program product of claim 10, wherein said generating comprises:
generating the instructions to increase the crop yield for regions assigned to said given cluster.

12. The computer program product of claim 10, wherein the program instructions executable by a computing device further cause the computing device to:
in response to said transmission, obtaining further data from one or more sensors of said one or more automated farming processing devices; and
adjusting said instructions based at least in part on said further data.

13. The computer program product of claim 10, wherein the program instructions executable by a computing device further cause the computing device to:
obtain information from one or more subject matter experts pertaining to one or more of the plurality of regions, in response to one or more counterfactual queries for the given cluster.

14. The computer program product of claim 13, wherein the program instructions executable by a computing device further cause the computing device to:
train the machine learning regressor model based at least on historical crop yields for said geographical area and historical agricultural practices for said geographical area; and
generate said counterfactual queries using the trained machine learning regressor model.

15. The computer program product of claim 10, wherein the program instructions executable by a computing device further cause the computing device to:
obtain one or more constraints for generating said instructions, the one or more constraints comprising one or more of: maximizing an overall crop yield for the given cluster; minimizing changes to existing agricultural practices; and decreasing the number of clusters.

16. The computer program product of claim 10, wherein:
for each respective one of the features, the corresponding impact value is output by the machine learning model to form an impact value space; and
the unsupervised clustering process is applied on at least a portion of the impact value space to assign each of the plurality of regions.

17. A system comprising:
a memory; and
at least one processor operably coupled to the memory and configured for:
obtaining data pertaining to a geographical area comprising a plurality of regions and one or more agricultural practices applied to the geographical area;
providing the obtained data to a machine learning regressor model, wherein the machine learning regressor model is trained to predict a crop yield for each of the plurality of regions based on a plurality of features identified in the data;
applying a machine learning model to determine a relative impact of each of the plurality of features on the crop yield predicted by the machine learning regressor model for each of the plurality of regions, wherein the relative impact of each of the features corresponds to one of: a negative impact value and a positive impact value;
identifying a subset of the plurality of features having the greatest impact on the predicted crop yield;
applying an unsupervised clustering process to assign each of the plurality of regions to a respective cluster of a set clusters, wherein the unsupervised clustering process assigns similar ones of said regions to the same cluster based at least on the subset of the plurality of features;
generating instructions that are specific to a given cluster in the set, wherein the instructions relate to agricultural tasks to be performed on the regions assigned to the given cluster, wherein said generating comprises: constructing a causal graph for the given cluster comprising a plurality of nodes and a plurality of edges, wherein each node represents one of the plurality of regions and its corresponding data, and each edge represents distance between the regions of the nodes corresponding to the edge and one or more transportation conditions between the regions of the nodes corresponding to the edge, wherein the one or more transportation conditions correspond to one or more geographical features between the regions;
transmitting said instructions to one or more automated farming processing devices in the form of computer code, thereby triggering the one or more automated farming devices to perform at least a portion of said agricultural tasks; and
updating over time at least one of: the set of clusters and the causal graph based on performance of said agricultural tasks.

18. The system of claim 17, wherein:
for each respective one of the features, the corresponding impact value is output by the machine learning model to form an impact value space; and
the unsupervised clustering process is applied on at least a portion of the impact value space to assign each of the plurality of regions.

19. The system of claim 17, wherein the one or more geographical features correspond to at least one of a forest and a mountain.

20. A computer-implemented method, the method comprising:
obtaining data for a set of farms, wherein the data comprise one or more of: location data for at least a portion of the farms in the set, historical crop yield data for at least a portion of the farms in the set, historical farming practices data climate data for at least a portion of the farms in the set, climate data for at least a portion of the farms in the set, and sensor data from one or more sensors of at least a portion of the farms in the set;

provide the obtained data to a machine learning regressor model, wherein the machine learning regressor model is trained to predict a crop yield for each farm in the set of farms based on a plurality of features identified in the data;

apply an explainable machine learning model to determine a relative impact of each of the plurality of features on the crop yield predicted by the machine learning regressor model for each of the plurality of regions, wherein the relative impact of each of the features corresponds to one of a negative Shapley value and a positive Shapley value;

identify a subset of the plurality of features having the greatest impact on the predicted crop yield;

apply an unsupervised clustering process to assign each farm within the set of farms to one of a plurality of clusters using an unsupervised cluster process, wherein the unsupervised clustering process assigns similar farms within the set of farms to the same cluster, based on based at least on the subset of the plurality of features;

generating, for a given one of the clusters, instructions for performing one or more agricultural tasks on the farms in the given cluster, wherein said instructions are generated to increase at least one of crop yield and profits, and wherein said generating comprises: constructing a causal graph for the given cluster comprising a plurality of nodes and a plurality of edges, wherein each node represents one of the plurality of farms and its corresponding data, and each edge represents distance between the farms of the nodes corresponding to the edge and one or more transportation conditions between the farms of the nodes corresponding to the edge, wherein the one or more transportation conditions correspond to one or more geographical features between the farms;

transmitting said instructions to one or more automated farming processing devices to carry out at least a portion of said agricultural tasks; and updating over time at least one of: the set of clusters and the causal graph based on performance of said agricultural tasks;

wherein the method is carried out by at least one computing device.

* * * * *